Jan. 29, 1957
W. H. ZINN ET AL
2,779,728
CONTROL DEVICE FOR A NEUTRONIC REACTOR
Filed Dec. 3, 1946
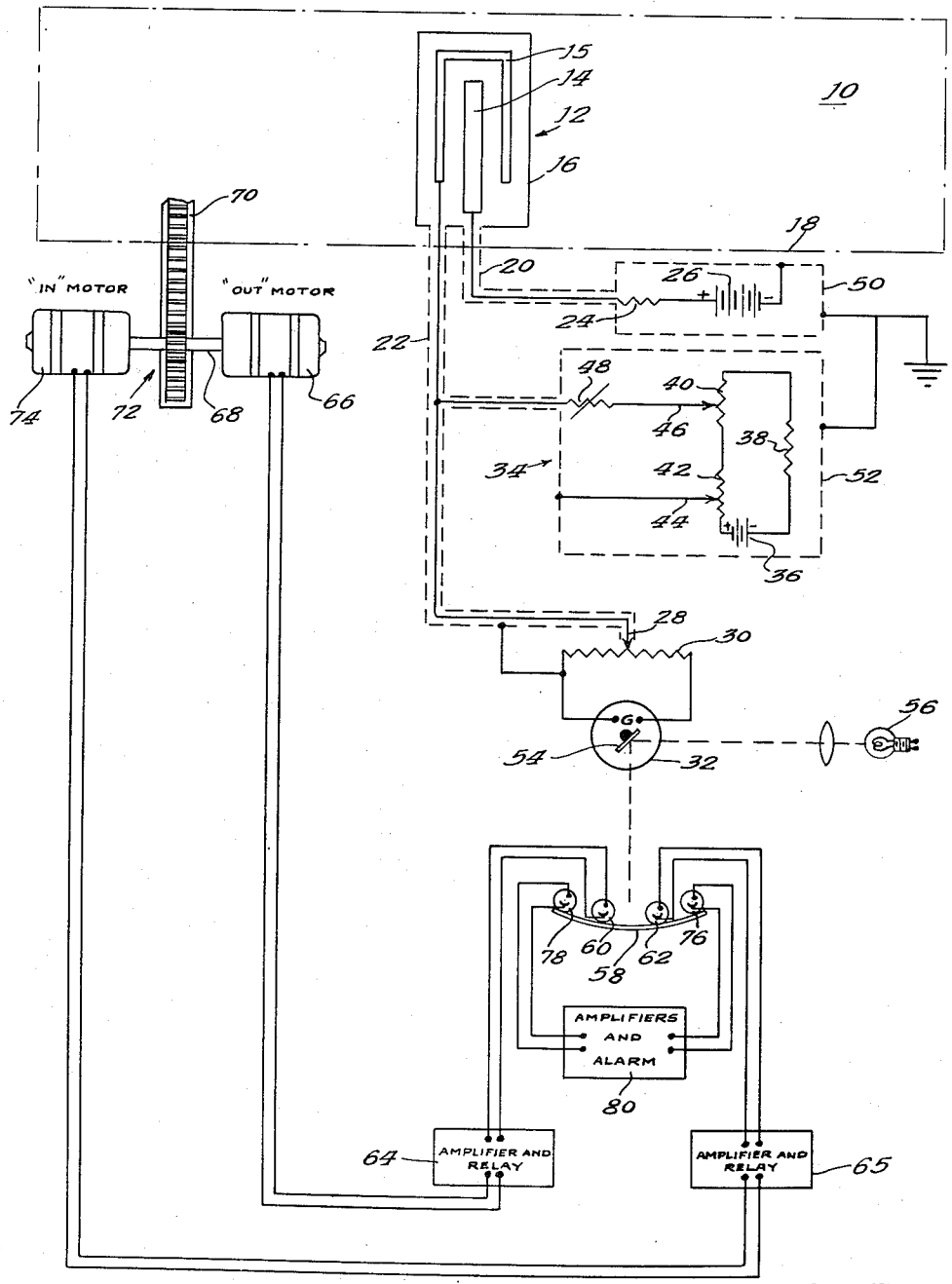
INVENTOR.
Walter H. Zinn
Thomas Brill
BY
Robert A. Lavender
Attorney United States Patent Office 2,779,728
Patented Jan. 29, 1957

2,779,728

CONTROL DEVICE FOR A NEUTRONIC REACTOR

Walter H. Zinn and Thomas Brill, Chicago, Ill., assignors to the United States of America as represented by the United States Atomic Energy Commission Application December 3, 1946, Serial No. 713,646

4 Claims. (Cl. 204—193)

This invention relates to an improvement in neutronic chain reactor systems. More specifically the invention relates to a simplified and improved automatic control system for maintaining the power output level of the reactor within predetermined limits.

According to the general theory well known in the art, control of the power output of neutronic chain reactors is achieved by controlling the neutron reproduction factor within the reactor. Of the many reactors in existence, a number have been described in a U. S. Patent 2,708,656, issued to E. Fermi et al. on May 17, 1955. When the neutron reproduction factor is unity, that is, when for each neutron producing fission there becomes available for producing further fissions, after losses due to escape and non-fission absorption, an additional neutron, the power output remains constant. When the neutron reproduction factor is greater than unity, the power output of the reactor rises. When, on the other hand, the neutron reproduction factor is less than unity, the power output falls. In the past it has been considered that the above general statements are completely applicable to control of the reactor; therefore, since it was considered that the power output would be falling or rising, if the neutron reproduction factor varied from unity, it was assumed that no stable control could be devised for holding the power output constant without using such relatively complicated devices as respond to the time derivative of the power output.

It was thought that if the instantaneous output should rise beyond a preset maximum due to perturbations in the reactor, the control device must necessarily be activated sufficiently to reduce the neutron reproduction factor below unity in order to restore the required conditions. It was further thought that the neutron reproduction factor is strictly a function of the position of the control rod, and that there is a unique position of the control rod for given ambient conditions to produce a reproduction factor of unity and thus a constant power output. Therefore, it was assumed that if devices were designed so simply as merely to change the reproduction factor in the proper sense when the instantaneous power output should vary from prescribed limits, the operation must necessarily be oscillatory. For, on the above assumptions, when the power output would exceed the allowable limit, the reproduction factor would be lowered; the power output would then continue to fall until its value fell below the lower predetermined limit, and would not rise until the controls changed again in such a sense as to bring the neutron reproduction factor again above unity. The cycle thus created would constitute an oscillatory, or so-called "hunting," control.

In order to obviate such anticipated difficulties, controls were designed to be responsive to the derivative of the power output and responsive to the difference between the desired output and the instantaneous output rather than solely to the instantaneous level's exceeding or falling below preset limits.

The essence of the present invention lies in the discovery that the assumptions heretofore made as to the operation of such a control are not completely applicable, and that, in fact, a control responsive solely to the power output, and changing the neutron reproduction factor in response to the variation of the power output from prescribed limits, may operate without producing oscillations or "hunting," thus producing great simplification in automatic controls for neutronic reactors.

It is accordingly an object of the present invention to provide a simple and accurate control system for maintaining the power output of a neutronic reactor within preset limits.

It is a further object of this invention to provide a control system for maintaining the power output of a neutronic reactor within preset limits, which system is responsive solely to the power output's exceeding or falling below said preset limits.

For better understanding of the invention, reference is made to the description below and to the drawing in which the single figure is a schematic illustration of a control system for a neutronic reactor.

Referring to the drawing, a neutronic reactor is generally designated by the numeral 10. Disposed within the active portion of the neutronic reactor 10 is an electrical means for producing a signal, such as an ionization chamber generally designated by the numeral 12, having electrodes 14 and 15 and an electric shield 16. The ionization chamber 12 is neutron responsive, being filled with a gas such as boron trifluoride. The reactor 10 is surrounded by a biological shield 18, for example of thick concrete, to prevent the existence of dangerous radioactivity in the vicinity of the reactor 10. Electrically shielded coaxial cables 20 and 22 connect the electrodes 14 and 15 respectively of the ionization chamber 12 to the exterior of the shield 18. Electrode 14 is connected in series with a high resistance 24 to the positive terminal of a voltage supply 26, the negative terminal of which is grounded. The other electrode 15 of the ionization chamber 12 is connected to ground through a galvanometer system to be described below.

As is well-known in the art, when the neutron responsive ionization chamber 12 is so connected and is exposed to neutron flux, the current through the ionization chamber 12 is proportional to the neutron flux incident upon the ionization chamber 12. As is also well-known in the art, the neutron flux in the reactor 10 is proportional to the instantaneous power output of the chain reactor 10. Therefore, the current through the ionization chamber 12 is proportional to the power output of the reactor 10. The purpose of the resistance 24 is to prevent a short circuit in the event of development of a fault in the cable 20.

The electrode 15 is connected to a tap 28 on a potentiometer 30, the terminals of which potentiometer 30 are connected to an electro-mechanical means, such as a mirror galvanometer 32, one terminal of said galvanometer 32 being grounded. The potentiometer 30 constitues an Ayrton shunt for the galvanometer 32. As is well-known in the art, by adjustment of the tap 28 of the Ayrton shunt the sensitivity of the galvanometer 32 may be accordingly adjusted without changing the impedance shunting the galvanometer for purposes of damping. The value of the potentiometer 30 preferably corresponds to the critical damping resistance of the galvanometer 32. The electrode 15 is likewise connected to a "bucking" current source generally designated by the numeral 34. The current source 34 consists of a battery 36, for example a 2 volt cell, in series with a resistor 38 and two potentiometers 40 and 42. The tap 44 on the potentiometer 42 is connected to ground. The tap 46 on the potentiometer 40 is connected to electrode 15 through a variable resistance 48. The system, as above described, is enclosed within a grounded electromagentic shield consisting of ionization chamber shield 16, shielded cables 20 and 22 and shielded chassis 50 and 52 containing the voltage supply 26 and the "bucking" current source 34 respectively.

The voltage appearing between the taps 44 and 46 is of such polarity that tap 46 is negative with respect to tap 44 and thus with respect to ground. As above stated, the tap 46 is connected through the resistor 48 to the electrode 15. It will be seen that if the "bucking" current source 34 be neglected, current flowing through the ionization chamber 12 flows through the galvanometer 32 to ground. Current from the "bucking" current source 34 flows in the opposite direction through the galvanometer 32. When both the ionization chamber 12 and the "bucking" current source 34 are connected, the current flowing through the ionization chamber 12 may be balanced out as regards the galvanometer 32 by adjustment of the resistor 48 and the potentiometer taps 46 and 44. By making the above-mentioned adjustments, any desired value of current in the ionization chamber 12 may be balanced out by the "bucking" current source 34 so that no current flows through the galvanometer 32.

Thus, the system may be set up so that, at any desired value of power output of the reactor 10, the galvanometer 32 draws no current. However, current will flow through the galvanometer 32 upon variation of the power output of the reactor 10 from such preset level. The polarity of the current flowing through the galvanometer 32 and thus the direction of deflection of the mirror 54 of the galvanometer 32 is determined by the direction in which the instantaneous power output of the reactor 10 varies from the preset value at which the galvanometer 32 was set to zero. The magnitude of the deflection of the mirror 54 for any given variation of current through the ionization chamber 12 may be adjusted by adjustment of the tap 28. The mirror 54 is placed to reflect light from a light bulb 56 onto a conventional ground glass optical galvanometer scale 58. When no current is flowing through the galvanometer 32 the reflected light beam from the mirror 54 is at the center of the scale 58, the zero position. The various described circuits and components which are connected to the ionization chamber can be generally referred to as the transmission means.

Phototubes 60 and 62 are mounted upon the scale 58 upon either side of the zero position of the scale, the sensitive areas of the phototubes 60 and 62 being exposed to the reflected beam when the galvanometer mirror 54 is sufficiently far from the zero position in the respective directions. The phototubes 60 and 62 are connected to electro-mechanical means, such as conventional phototube amplifiers and relays 64 and 65, respectively. The amplifier and relay 64 are connected to a positioning mechanism, such as a motor 66, having a shaft 68 adapted to drive the control rod 70 by means of a rack and pinion 72, the direction of such driving being in such a sense as to retract the control rod 70 from the reactor 10. The control rod 70 may be of a design well-known in the art comprising, for example, cadmium, which, as is well-known, serves as a neutron absorber well adapted for the control of a chain reaction. The amplifier and relay 65 are similarly connected to a motor 74 which is likewise connected to the shaft 68, but produces a motion of the rod 70 into the reactor 10.

The motion of the galvanometer mirror 54 is such that, when the neutron intensity within the reactor 10 increases, the beam moves from the zero position on the scale 58 toward the phototube 62. When this motion is sufficient so that the beam falls on the phototube 62 the amplifier and relay 65 actuate the "in" motor 74 thus driving in the rod 70 and reducing the neutron reproduction factor of the reactor 10. Conversely, when the neutron intensity decreases sufficiently to drive the mirror 54 so that the light beam falls on the phototube 60, the "out" motor 66 is actuated by the amplifier and relay 64 and the control rod 70 is retracted from the reactor 10, thus increasing the neutron reproduction factor of the reactor. In either case the motion continues as long as the light beam is directed at the phototube 60 or 62. When the intensity increases or decreases, as the case may be, to bring the galvanometer 32 back toward the zero position, the motor 66 or 74 ceases to run when the light beam returns to the region between the phototubes 60 and 62. Since any position on the scale 58 corresponds to a given neutron intensity, and thus power output, in the reactor 10, the region on the scale 58 between the phototubes 60 and 62 constitutes a region of values of power output of the reactor 10 within whose limits the operation of the reactor 10 is held by the system.

In the event of some rapid change or perturbation within the reactor 10, it is possible that the neutron intensity may rise or fall at such a great rate that the light beam may go on past the phototube 60 or 62, as the case may be. In the event of a rapid rise, for example, the light beam might pass over the phototube 62 so quickly that the "in" motor 74 does not run for a sufficient period to reduce the reproduction factor of the reactor 10 to a point where the power output is caused to fall. In such a case the intensity might continue to rise. Therefore, there are placed upon either end of the scale 58 additional phototubes 76 and 78. These are connected to an amplifier and alarm system 80 which sets off an alarm should either of the phototubes 76 or 78 be exposed to the light beam, the operator of the reactor being thus notified of the necessity of restoring the power level by manual means (not shown in the drawing).

As has been explained above, the system illustrated in the drawing constitutes a limit control in which the control rod 70 is driven into the reactor 10 at a constant speed as long as the neutron intensity within the reactor exceeds a level corresponding to the inner edge of the sensitive position of the phototube 62. The control rod 70 is retracted at a constant speed if the neutron intensity in the reactor 10 falls below a level corresponding to the inner edge of the sensitive surface of the phototube 60. Heretofore, it has been thought that such a device could not produce satisfactory operation since it was thought that if the galvanometer 32 should be in the zero position and the current in the ionization chamber 12 should then decrease sufficiently far to expose the phototube 60 to the light beam, the neutron reproduction factor of the reactor 10 being smaller than unity, the beam would remain in this region until the "out" motor 66 had withdrawn the control rod 70 sufficiently so that the reproduction factor would be greater than unity. It was then thought that the light beam must of necessity drift to the other limit, the phototube 62, where it would again remain until the reproduction factor was below unity and that the system must therefore continuously oscillate, having no stable position. The present inventors have discovered that these assumptions and this reasoning heretofore universally accepted in the art are not tenable in fact and that a system such as that illustrated in the drawing will provide stable operation.

In order to provide stable operation it is necessary that the circuit parameters and the elements chosen for use in the system be properly selected. In one application of the device illustrated in the drawing, it has been used to control a neutronic reactor 10 at a value of power output of approximately 300 kw. The ionization chamber 12 produces an ion current of 75 microamperes when exposed to the neutron flux present in the reactor when operated at the above level. The galvanometer 32 has a sensitivity of .003 microampere per millimeter of movement of the beam on the scale 58. The galvanometer 32 used in this application has a natural period of three seconds and is shunted by the potentiometer 30 of the value of critical damping resistance of the galvanometer 32. At the 300 kw. output level the galvanometer 32 is adjusted to $\frac{1}{10}$ of its full sensitivity or .03 microamperes per millimeter on the scale 58. The sensitive portions of the phototubes 60 and 62 are each about 4 cm. long. The light beam is about 3 cm. in diameter. The sensitivity of the amplifiers and relays 64 and 65 is such that if one centimeter of either of the phototubes 60 or 62 is illuminated the motor 66 or 74 is energized. Thus each motor 66 and 74 operates over a range of about 8 cm. on the scale 58. The space between the two ranges is set at approximately 2.5 cm. by spacing between the phototubes 60 and 62. Since the normal current in the ionization chamber 12 is 75 microamperes and thus would correspond to approximately a 250 cm. deflection on the scale 58, a change of ±½% from the correct power will start the motor 66 or 74 as the case may be. Thus the preset neutron density level at which the control means is actuated to increase the neutron reproduction factor is lower than the preset neutron density level at which the control means is actuated to decrease the neutron reproduction factor by substantially one percent of the median of the levels. The value of the battery 36 is 2.1 volt. The value of the resistor 38 is 6,000 ohms. The potentiometer 40, providing coarse zero setting, is 470 ohms, and the potentiometer 42, providing fine control of the zero setting, is a 100 ohm slide wire. The variable resistor 48 has a maximum value of 2 megohms.

In operation it is found that a stray perturbation in the reactor 10, which changes the reproduction factor in the reactor 10 acts, as expected, to move the beam onto one of the phototubes but does not produce the continuous oscillation universally assumed to result before this invention. If the perturbation is slight it is found that the beam merely moves back into the region within which control is sought. However, if the disturbance is sudden and the rate of moving out of the control zone is fast, the beam will, in fact, move back all of the way to the other end of the range and may then again return to the first end of the range. However, these oscillations are of a damped nature. They do not continue indefinitely. The amplitude of the oscillation decreases in each cycle and the period of the oscillation increases in each cycle until stability within the controlled range is again achieved.

The exact theory of operation of the device is not presently known. However, there are known a number of factors which tend toward the desirable result thus achieved, and which were not considered in reaching the conclusion heretofore universally held that the device could not operate in the manner described but must continuously oscillate.

First, it is not true that the neutron intensity may not increase when the neutron reproduction factor of the reactor is below unity. As a matter of fact, for all values of the neutron reproduction factor below unity the neutron intensity always increases as the neutron reproduction factor is increased. This results from the fact that in the reactor containing fissionable materials there is always present a background of spontaneous fissions which produce neutrons. These neutrons go on to produce further fissions in the fissionable material. There is thus at all times a chain reaction in progress in the reactor. However, when the reproduction factor is less than unity the chain reaction is not divergent but is convergent. Although in design of the chain reactor itself the effect is so small as to be virtually negligible, a chain reactor will not in fact run at constant power output if the neutron reproduction factor is unity. If, for every neutron produced by a fission induced by absorption of another neutron, there is produced and available to induce another fission one neutron, then the neutron density and thus the power output will not remain constant but will grow due to the spontaneous fissions which do not require incident neutrons. Therefore, in order to have a constant output it is necessary that the neutron reproduction factor be slightly less than unity, the deficit of neutrons in each generation of neutrons being made up by spontaneous fission.

Further, it has heretofore been supposed that in connection with such a control system as herein described the existence of constant level of power output occurs at only one position of the control rod, assuming all other conditions such as temperature effects and barometric pressure to remain constant. However, upon analysis, it may be seen that this assumption is unjustifiable. As above stated, the conditions of constant power output are achieved when the position of the control rod is such as to make the actual reproduction factor slightly smaller than unity, the deficit of neutrons being supplied by spontaneous fissions. Suppose that the reactor is operating at a low power output of a constant value. In order to produce such conditions for each neutron absorbed to produce a fission, there must be one neutron produced available to induce a further fission. However, if there is less than one neutron so produced and available from the neutron-induced fission itself, the deficit may be supplied from another source, such as spontaneous fission. The spontaneous fission rate may be considered to be a constant which is not a function of the power level or of the reproduction factor. Let it be supposed now that the control rod is very slightly withdrawn from the reactor, the withdrawal not being sufficient to produce a reproduction factor greater than unity. In other words, the withdrawal of the neutron absorbing control rod is not sufficient to make the chain reaction divergent; that is to say, the neutrons produced by non-spontaneous fission still cannot, with the losses due to the presence of the control rod and other absorbers and the finite size of the reactor, maintain the chain reaction. Under these conditions the power output of the reactor will nevertheless rise so long as the number of neutrons contributed by spontaneous fission is greater than the deficit which would occur in the absence of spontaneous fission. At the point of equality between this deficit and the spontaneous fission contribution, the power output will again stabilize. Thus it will be seen that there is a small range of positions of the control rod in which the steady state power output is a direct function of the position of the control rod. It will be seen readily that this fact obviates at least partially the supposedly inherent oscillation of a limit control system such as that herein described.

In addition, it has been observed that if the reproduction factor is equal to or very slightly greater than unity and the control rod is suddenly inserted to a point known to corresponding to a steady value of power output, the power output will at the time of insertion fall below the steady state value and gradually rise up and remain stable. This observation is likewise very important to the operation of a system such as here described because it demonstrates that under certain conditions, notably sufficient speed of driving in the control rod, the instantaneous neutron density and power output may be made to fall even though the ultimate position of the control rod is one which produces stable rather than rising or falling operation.

The effect of delayed neutrons likewise contributes to the stable operation of the limit control.

It thus appears that the assumptions heretofore made upon which there was based the conclusion that a limit control for a neutronic reactor could not operate without oscillation or "hunting" were erroneous at least to the extent of the qualifications upon these assumptions which have been observed, as above-described. It should be noted that in setting up such a system for control of a neutronic reactor at a given power level it is necessary to adjust the limits outside of which the motors commence to run in such a manner as to produce the desired stable operation. If an attempt is made to make the range of control too narrow, the system will oscillate despite the factors tending toward stability described above.

It will, of course, be understood that the teachings of the present invention are not limited to the device illustrated in the drawing, which is selected for illustrative purposes only and which is only one of the many ways of applying the teachings of this invention. Many alternative neutron responsive devices, electronic systems and devices for controlling and changing the reproduction factor of the reactor will readily be devised by persons skilled in the art.

What is claimed is:

1. A control system for a neutronic reactor comprising, in combination, electrical means to produce an electrical signal proportional to neutron flux density in a reactor and adapted to be placed in a reactor, a pair of spaced phototubes, a light source, electro-mechanical means coupled and responsive to the electrical means to position a beam of light from the light source on a path including the phototubes in accordance with the magnitude of the electrical signal, a control member adapted to be selectively positioned in a reactor to vary the neutron reproduction ratio thereof, a positioning mechanism coupled to the control member, an electro-mechanical means coupled to the phototubes to actuate the positioning mechanism in directions to increase and decrease the neutron reproduction ratio when the beam falls on respective phototubes.

2. The apparatus of claim 1 wherein there are provided a further pair of phototubes beyond the first phototubes in the path of the beam, and an alarm means coupled to said further pair of phototubes and actuable by incidence of the light beam on one of them.

3. A limit control system for a neutronic chain reactor comprising, in combination, a neutron-responsive means for producing signals corresponding to the magnitude of changes in neutron density within the reactor, control means for raising and lowering the neutron reproduction factor within the reactor, a pair of light-responsive detectors spatially disposed, means connected to the neutron-responsive means for angularly directing a beam of light between the detectors, the displacement position of the beam between the detectors corresponding to the magnitude of the signal, circuit means connected to both the detectors and the control means, said circuit means responsive to light received by any one of the detectors to actuate the control means to vary the neutron reproduction factor in a direction opposite to its previous change whereby the light beam in correspondence thereto will change its displacement direction toward the other detector.

4. The control system of claim 3 wherein there are provided another pair of light-responsive detectors beyond the first pair of detectors in the path of the light beam, and alarm means coupled to said further pair of detectors and actuable by incidence of the light beam on one of them.

References Cited in the file of this patent

UNITED STATES PATENTS

| 1,378,971 | Moore | May 24, 1921 |
| 2,140,933 | Dennis | Dec. 20, 1938 |
| 2,287,788 | Diekhoff | June 30, 1942 |
| 2,288,387 | Berry | June 30, 1942 |
| 2,652,524 | Hornfeck | Sept. 15, 1953 |

FOREIGN PATENTS

| 114,150 | Australia | May 2, 1940 |
| 114,151 | Australia | May 3, 1940 |
| 233,011 | Switzerland | Oct. 2, 1944 |

OTHER REFERENCES

Smyth: "Atomic Energy for Military Purposes," pages 85 and 179, August 1945.

American Journal of Physics, vol. 20, No. 9 (December 1952), pp. 536, 556–558 (an article by Fermi).